United States Patent
Gu et al.

(10) Patent No.: US 12,411,328 B2
(45) Date of Patent: Sep. 9, 2025

(54) METHOD FOR PTYCHOGRAPHY POSITION CORRECTION BASED ON PROBE WEIGHTING

(71) Applicant: HUAZHONG UNIVERSITY OF SCIENCE AND TECHNOLOGY, Hubei (CN)

(72) Inventors: Honggang Gu, Hubei (CN); Lei Zhong, Hubei (CN); Shiyuan Liu, Hubei (CN); Li Liu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 339 days.

(21) Appl. No.: 18/346,255

(22) Filed: Jul. 2, 2023

(65) Prior Publication Data
US 2024/0377626 A1    Nov. 14, 2024

(30) Foreign Application Priority Data

May 11, 2023   (CN) .......................... 202310532396.3

(51) Int. Cl.
*G02B 21/06* (2006.01)
*G02B 21/36* (2006.01)

(52) U.S. Cl.
CPC .......... *G02B 21/06* (2013.01); *G02B 21/367* (2013.01)

(58) Field of Classification Search
CPC .............................. G02B 21/06; G02B 21/367
See application file for complete search history.

(56) References Cited

U.S. PATENT DOCUMENTS

2016/0178883 A1 * 6/2016 Horstmeyer ......... G02B 21/367
                                                                    348/80
2017/0069116 A1 * 3/2017 Karl ...................... G06T 11/005

OTHER PUBLICATIONS

Andrewm.Maiden et al., "An improved ptychographical phase retrieval algorithm for diffractive imaging", Ultramicroscopy, vol. 109, Issue 10, Sep. 2009, pp. 1256-1262.
A.M. Maiden et al., "An annealing algorithm to correct positioning errors in ptychography", Ultramicroscopy, vol. 120, Sep. 2012, pp. 64-72.

(Continued)

*Primary Examiner* — Lauren Nguyen
(74) *Attorney, Agent, or Firm* — JCIPRNET

(57) ABSTRACT

The disclosure provides a method for ptychography position correction based on probe weighting. The method includes: collecting diffraction light field intensity information and simultaneously initializing information functions of illumination probes and a sample to be tested and probe positions; obtaining and importing an exit wave into a propagation model to obtain a simulated diffraction light field and replacing the diffraction light field intensity information to obtain an updated diffraction light field; importing the updated diffraction light field into a backpropagation model and obtaining a diffraction exit wave and updating the information functions of the sample to be tested and the illumination probes at each scan position; and forming a probe matrix around the probe positions, updating the probe positions after calculating a correlation, and repeating the above steps to iterate until the predetermined number of iterations is completed or a predetermined condition is reached.

7 Claims, 5 Drawing Sheets

(56) References Cited

OTHER PUBLICATIONS

Alex Shenfield et al., "Evolutionary determination of experimental parameters for ptychographical imaging", Journal of Applied Physics, Jun. 27, 2011, pp. 1-9.
F. Guzzi et al., "Refining scan positions in Ptychography through error minimisation and potential application of Machine Learning", Journal of Instrumentation, vol. 13, Jun. 4, 2018, pp. 1-13.
Manuel Guizar-Sicairos et al., "Efficient subpixel image registration algorithms", Optics Letters, vol. 33, No. 2, Jan. 15, 2008, pp. 156-158.
Fucai Zhang et al., "Translation position determination in ptychographic coherent diffraction imaging", Optics Express, vol. 21, No. 11, May 30, 2013, pp. 13592-13606.
J. R. Fienup, "Phase retrieval algorithms: a comparison", Applied Optics, vol. 21, Issue 15, Aug. 1982, pp. 1-13.
J. M. Rodenburg et al., "A phase retrieval algorithm for shifting illumination", Applied Physics Letters, vol. 85, No. 20, Nov. 15, 2004, pp. 4795-4797.
Pierre Thibault et al., "Probe retrieval in ptychographic coherent diffractive imaging", Ultramicroscopy, vol. 109, Issue 4, Mar. 2009, pp. 338-343.

\* cited by examiner

METHOD FOR PTYCHOGRAPHY POSITION CORRECTION BASED ON PROBE WEIGHTING

CROSS-REFERENCE TO RELATED APPLICATION

This application claims the priority benefit of China application serial no. 202310532396.3, filed on May 11, 2023. The entirety of the above-mentioned patent application is hereby incorporated by reference herein and made a part of this specification.

BACKGROUND

Technical Field

The disclosure belongs to the technical field of coherent diffraction imaging, and in particular, relates to a method for ptychography position correction based on probe weighting.

Description of Related Art

Coherent diffraction imaging (CDI) is a technique for high-resolution imaging. In CDI, coherent light is used for diffraction experiments, and the wavefront information scattered by the sample surface is measured to reconstruct the physical structure of the sample. The phase issue is a common problem in CDI because cameras can only record light intensity information and cannot directly measure phase information. However, phase information is crucial for image reconstruction of objects and is the key factor in determining the shape and structure of objects. Generally, CDI can be divided into two parts depending on the number of recorded diffraction fields: single-intensity and multi-intensity, and ptychography is the most commonly used method among the multi-intensity algorithms.

Ptychography divides the scanned area into multiple overlapping regions and collects a series of diffraction images by moving the relative position between the probe and the sample.

These diffraction fields can be used to reconstruct the structure and phase information of the sample using the ePIE algorithm (with reference to Ultramicroscopy 109 (2009), 1256 to 1262). In the ptychography collection system, inaccurate parameters, such as the lateral position error of the probe movement and the axial position error of the camera, etc., will greatly reduce the reconstruction quality of the sample to be tested. It thus can be seen that the position correction of the probe is particularly important in the research of ptychography.

In the related art, the simulated annealing position correction method (with reference to Ultramicroscopy 120 (2012), 64 to 72) is a relatively classic method. The annealing position correction method is based on a trial-selection strategy and tests many trial positions for each probe position. This method is consistent with the principle of the genetic algorithm (with reference to J. Appl. Phys. 109, 124510 (2011)) and the machine learning method based on the structural similarity index (J. Instrum. 13 (6), C06002 (2018)), but the cost is a large amount of calculation, and the disadvantage is obvious when facing a large amount of experimental data to be processed. Based on an efficient subpixel image registration algorithm (with reference to Opt. Lett. 33 (2), 156 to 158 (2008)), a positional cross-correlation algorithm is proposed (with reference to Opt. Express 21 (11), 13592 to 13606 (2013)), and cross-correlation is performed on the samples to be tested before and after the update to search for the direction and size of the updated position by means of Fourier domain up-sampling. The calculation accuracy provided by this method is high and will increase with the accuracy of up-sampling, but the position correction speed is relatively slow.

SUMMARY

In view of the above defects found in the related art, the disclosure provides a method for ptychography position correction based on probe weighting and aims to solve the problem of contrast degradation of a sample to be tested caused by position errors in the currently-available ptychography, the problem of slow convergence speeds found in a currently-available position correction method, and the problem that the position correction method iteratively falls into a local optimal solution or fails to converge at all when an error is large.

To achieve the above, the disclosure provides a method for ptychography position correction based on probe weighting, and the method includes the following steps.

In S1, diffraction light field intensity information of each scan position of a sample to be tested is collected, and information functions of illumination probes and the sample to be tested and probe positions are simultaneously initialized.

In S2, information parameters of the sample to be tested and the illumination probes at each scan position are multiplied to obtain an exit wave.

In S3, the exit wave obtained in step S2 is imported into a propagation model to obtain a simulated diffraction light field, intensity information in the simulated diffraction light field is replaced with the diffraction light field intensity information obtained in step S1, and an updated diffraction light field is obtained.

In S4, the updated diffraction light field is imported into a backpropagation model, and a diffraction exit wave is obtained.

In S5, the information functions of the sample to be tested and the illumination probes at each scan position are updated based on the exit wave obtained in step S1 and the diffraction exit wave obtained in step S4.

In S6, a probe matrix is formed around the probe positions, a correlation is calculated with the updated information functions of the sample to be tested and the illumination probes, and the probe positions are accordingly updated.

In S7, steps S2 to S6 are repeated to iterate until the predetermined number of iterations is completed or a predetermined condition is reached according to the updated information functions of the illumination probes and the sample to be tested and the updated probe positions, the information functions of the illumination probes and the sample to be tested and the probe positions are outputted, and the ptychography position correction is accordingly completed.

In a preferred embodiment of the disclosure, in step S1, the illumination probes and the illuminated sample to be tested maintain a same dimension.

In a preferred embodiment of the disclosure, in step S3, propagation methods of the propagation model include Fresnel propagation, Fraunhofer propagation, and angular spectrum propagation.

In a preferred embodiment of the disclosure, step S5 specifically is:

$$O_m'(r) = O_m(r) + \alpha \frac{P_m^*(r, \lambda)}{|P_m(r, \lambda)|_{max}^2} (\varphi_m'(r, \lambda) - \varphi_m(r, \lambda)) \text{ and}$$

$$P_m'(r, \lambda) = P_m(r, \lambda) + \beta \frac{O_m^*(r)}{|O_m(r)|_{max}^2} (\varphi_m'(r, \lambda) - \varphi_m(r, \lambda))$$

in the formulas, $\alpha$ and $\beta$ respectively are updated and iterative search step sizes of the sample to be tested and the illumination probes, $O_m(r)$ and $O_m'(r)$ respectively are the information functions of the sample to be tested before and after a $m^{th}$ scan position is updated, $P_m(r,\lambda)$ and $P_m'(r,\lambda)$ respectively are the information functions of the illumination probes before and after the $m^{th}$ scan position is updated, $\varphi_m(r,\lambda)$ and $\varphi'_m(r,\lambda)$ respectively are the exit wave and the diffraction exit wave at the $m^{th}$ scan position, r is coordinates in real space, $\lambda$ is a wavelength of the illumination probes, and * is a conjugate operation of a complex matrix.

In a preferred embodiment of the disclosure, step S6 specifically includes the following.

In S61, translating the illumination probes up, down, left, and right around the probe positions is performed to form the probe matrix, $$\varphi_m(r,\lambda), \varphi'_m(r,\lambda),$$

in the formula, $r'_m(i)$ is coordinates in real space of an $i^{th}$ illumination probe at a $m^{th}$ scan position in the probe matrix, $r_m(i)$ is center coordinates of the $i^{th}$ illumination probe in probe matrix at the $m^{th}$ scan position, and $l_i$ represents a shift distance between the $i^{th}$ illumination probe and a center in the probe matrix.

In S62, the correlation between the probe matrix obtained in step S61 and the updated information functions of the sample to be tested and the illumination probes is calculated, $$CC_m(i) = \sum O_m'(r) \cdot P_m'(r, \lambda) \cdot P_m(r'_m(i), \lambda) \cdot O_m(r),$$

in the formula, $CC_m(i)$ is a correlation numerical matrix in the probe matrix, $O_m'(r)$ is the information function of the sample to be tested after the $m^{th}$ scan position is updated, $P_m'(r,\lambda)$ is the information function of the illumination probes after the $m^{th}$ scan position is updated, $P_m(r'_m(i),\lambda)$ is the information function of the $i^{th}$ illumination probe in the probe matrix before the $m^{th}$ scan position is updated, and $O_m(r)$ is the information function of the sample to be tested before the $m^{th}$ scan position is updated.

In S63: the probe positions are updated according to the correlation obtained in step S62, $$D_j = \beta' \left[ \sum CC_m(i) * r'_m(i) \right] + \gamma D_{j-1},$$

in the formula, $\beta'$ is an updated and iterative search step size of the probe position, $\gamma$ is a ratio of the update to keep the previous update step size, and $D_j$ and $D_{j-1}$ respectively are the probe positions of the $j^{th}$ iteration and the j-$1^{th}$ iteration.

In a preferred embodiment of the disclosure, in step S7, the predetermined number of iterations is greater than 100.

In a preferred embodiment of the disclosure, in step S7, the predetermined condition is that a position error satisfies a convergence condition, and a calculation formula of the position error is:

$$E_M = \frac{\sum_M (r'_m - r_m)}{M},$$

in the formula, $E_M$ is the position error, M is the number of diffraction fields, $r'_m$ is coordinates of an actual position of a probe, and $r_m$ is coordinates of a correct position of the probe.

To sum up, the above technical solutions provided by the disclosure have the following beneficial effects compared with the related art.

1. In the disclosure, the probe search range is expanded by forming a probe matrix around the actual probes, and the search position is updated through probe matrix weighting. Further, the position of the center probe is updated by using the cross-correlation gradient before and after the virtual array probes are updated. Compared to the heuristic position correction method, sub-pixel position correction accuracy may be achieved, and when the position error converges to the correct position, the central axisymmetric array probes are constrained to one another, and the mutual crosstalk of the local unconverged regions to the global scan position correction is prevented from occurring. In this way, the convergence stability and convergence accuracy of the method for ptychography position correction are improved.

2. In the disclosure, a weight function is particularly proposed to optimize the ptychography position correction. The update search of position calibration based on the cross-correlation gradient of the weight function can greatly avoid the reconstruction algorithm from falling into local optimum. Compared to the mean weight method and the conventional single-probe cross-correlation position error correction methods, this method improves the convergence speed and convergence robustness of the algorithm without sacrificing calculation efficiency.

BRIEF DESCRIPTION OF THE DRAWINGS

In the accompanying drawings, the same reference numerals are used to represent identical or similar elements or structures, where:
1: laser, 2: beam expander, 3: adjustable diaphragm, 4: focusing lens/mirror, 5: sample to be tested, and 6: camera.

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the invention merely and are not used to limit the invention.

Figure 1:
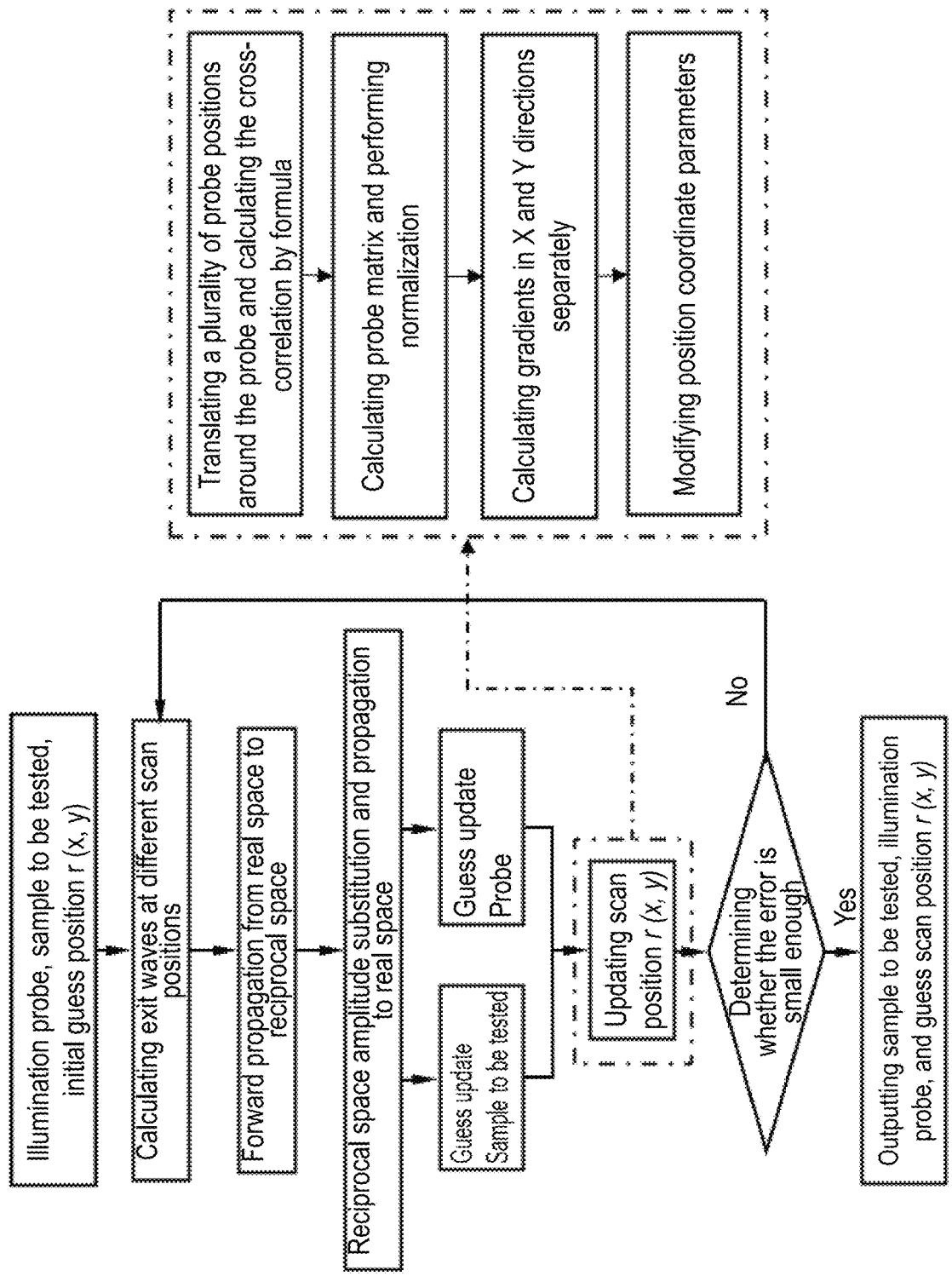
FIG. 1 is a flow chart of a method for ptychography position correction based on probe weighting provided by an embodiment of the disclosure.
Figure 2:
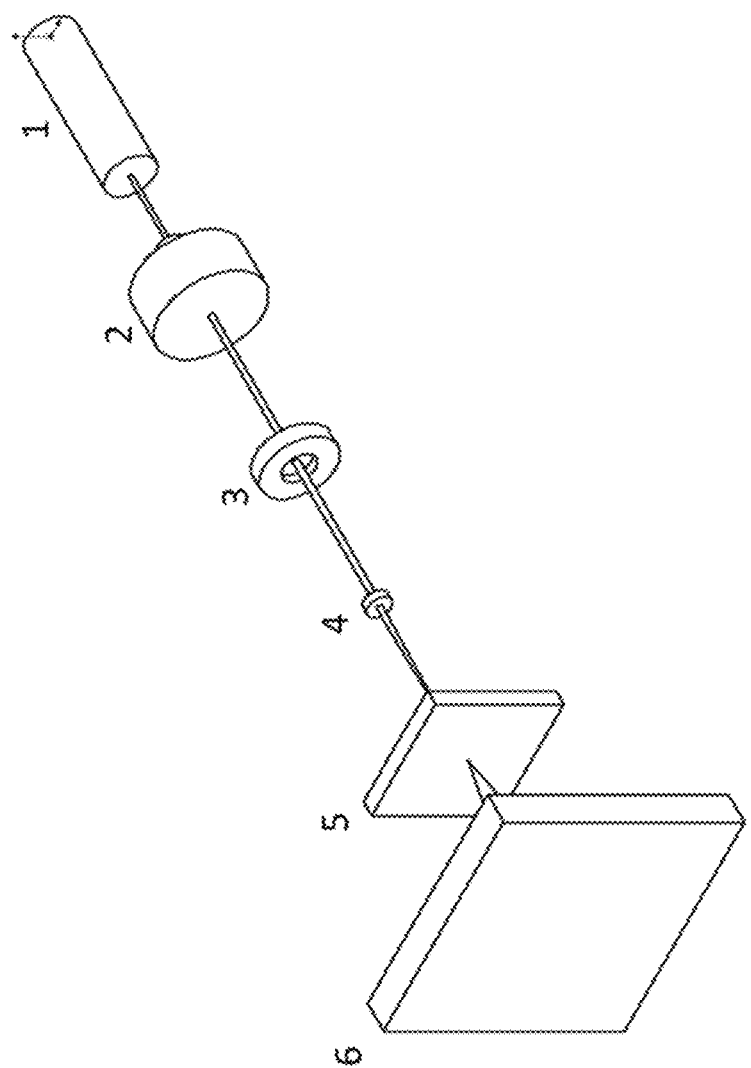
FIG. 2 is a schematic diagram of an optical path of a ptychography imaging system provided by an embodiment of the disclosure.

As shown in FIG. 1, the disclosure provides a method for ptychography position correction based on probe weighting. This method is applicable to a ptychography imaging system as shown in FIG. 2, employs a reflective imaging system or a transmissive imaging system, and includes a laser 1, a beam expander 2, an adjustable diaphragm 3, a focusing lens/mirror 4, a sample to be tested 5, and a camera 6 arranged in sequence in a light propagation direction. This method specifically includes the following step.

In S1, the camera 6 is used to collect diffraction light field intensity information $I_m(q)$ of each scan position of the sample to be tested, m is the scan position during the motion, and q is frequency domain coordinates. A complex amplitude function $P(r,\lambda)$ of an illumination probes, a complex amplitude function $O(r)$ of the sample to be tested, and a probe position r are simultaneously initialized, $\lambda$ is a wavelength of the illumination probes, to ensure that dimensions of the illumination probes and the sample to be tested are the same, and real-time position coordinates of the probes are required to correspond one-to-one.

In S2, the complex amplitude function $P(r,\lambda)$ of the sample to be tested and the complex amplitude function $P(r,\lambda)$ of the illumination probes at each scan position are multiplied to obtain an exit wave, $$\varphi_m(r, \lambda) = P(r, \lambda)O_m(r), \tag{1}$$

in the formula, $\varphi_m(r,\lambda)$ is the exit wave.

In S3, the exit wave $\varphi_m(r,\lambda)$ obtained in step S2 is imported into a propagation model and propagated into a reciprocal space, so that simulated diffraction light fields at different positions of a detection plane of the camera 6 are obtained, $$\Phi_m(q, \lambda) = prop(\varphi_m(r, \lambda)), \tag{2}$$

in the formula, $\Phi_m(q,\lambda)$ is the simulated diffraction light field of the illumination probes in the reciprocal space at a $m^{th}$ scan position, and prop is a propagation method (including but not limited to Fresnel propagation, Fraunhofer propagation, angular spectrum propagation, etc.) of the light field.

Intensity information in the diffraction light field is then replaced by the diffraction light field intensity information $I_m(q)$ obtained in step S1, that is, an amplitude constraint of the reciprocal space, and an updated diffraction light field is thus obtained, $$\Phi'_m(q, \lambda) = \frac{\sqrt{I_m(q)}}{\sqrt{|\Phi_m(q, \lambda)|^2}} \Phi_m(q, \lambda), \tag{3}$$

in the formula, $\Phi'_m(q,\lambda)$ is the updated diffraction light field obtained after the amplitude constraint of the illumination probes at the $m^{th}$ scan position.

In S4, the updated diffraction light field is imported into a backpropagation model of S3, and a diffraction exit wave is obtained, $$\varphi'_m(r, \lambda) = iprop(\Phi'_m(q, \lambda)), \tag{4}$$

in the formula, $\varphi'_m(r,\lambda)$ is the diffraction exit wave, and iprop is a light field backpropagation model.

In S5, information functions of the sample to be tested and the illumination probes at each scan position are updated based on the exit wave obtained in step S1 and the diffraction exit wave obtained in step S4, $$O_m'(r) = O_m(r) + \alpha \frac{P_m^*(r, \lambda)}{|P_m(r, \lambda)|^2_{max}}(\varphi'_m(r, \lambda) - \varphi_m(r, \lambda)) \text{ and} \tag{5}$$

$$P_m'(r, \lambda) = P_m(r, \lambda) + \beta \frac{o_m^*(r)}{|o_m(r)|^2_{max}}(\varphi'_m(r, \lambda) - \varphi_m(r, \lambda)) \tag{6}$$

in the formulas, $\alpha$ and $\beta$ respectively are updated and iterative search step sizes of the sample to be tested and the illumination probes, and the values are between [0,1], $O_m(r)$ and $O_m'(r)$ respectively are the information functions of the sample to be tested before and after a $m^{th}$ scan position is updated, $P_m(r,\lambda)$ and $P_m'(r,\lambda)$ respectively are the information functions of the illumination probes before and after the $m^{th}$ scan position is updated, $\varphi_m(r,\lambda)$ and $\varphi'_m(r,\lambda)$ respectively are the exit wave and the diffraction exit wave at the $m^{th}$ scan position, r is coordinates in real space, $\lambda$ is a wavelength of the illumination probes, and * is a conjugate operation of a complex matrix.

In S6, a probe matrix is formed around the pre-updated illumination probes, a correlation is calculated with the updated illumination probes, and the probe positions are accordingly updated.

In S7, steps S2 to S6 are repeated to iterate until the predetermined number of iterations is completed or a predetermined condition is reached according to the updated information functions of the illumination probes and the sample to be tested and the updated probe positions, the information functions of the illumination probes and the sample to be tested and the probe positions are outputted, and the ptychography position correction is accordingly completed.

Further, step S6 specifically includes the following.

In S61: translating the pre-updated illumination probes up, down, left, and right is performed around the probe positions to form the probe matrix, $$r'_m(i) = r_m(i) + l_i, \tag{7}$$

in the formula, $r'_m(i)$ is coordinates in real space of an $i^{th}$ illumination probe at a $m^{th}$ scan position in the probe matrix, $r_m(i)$ is center coordinates of the $i^{th}$ illumination probe in probe matrix at the $m^{th}$ scan position, and $l_i$ represents a shift distance between the $i^{th}$ illumination probe and a center in the probe matrix.

In S62, the correlation between the probe matrix obtained in step S61 and the updated information functions of the sample to be tested and the illumination probes is calculated, $$CC_m(i) = \sum O_m'(r) \cdot P_m'(r, \lambda) \cdot P_m(r'_m(i), \lambda) \cdot O_m(r) \tag{8}$$

in the formula, $CC_m(i)$ is a correlation numerical matrix in the probe matrix, and $P_m(r'_m(i),\lambda)$ is the information function of the $i^{th}$ illumination probe in the probe matrix before the $m^{th}$ scan position is updated.

In S63, the probe positions are updated according to the correlation obtained in step S62, $$g = \sum CC_m(i) * r'_m(i) \text{ and} \tag{9}$$

$$D_j = \beta' g + \gamma D_{j-1} \tag{10}$$

in the formulas, $g_x$ and $g_y$ are update gradients of probe weighting, and the values are between [0,1], $\beta'$ is an updated and iterative search step size of the probe position, $\gamma$ is a ratio of the update to keep the previous update step size, and the value is between [0,1], and $D_j$ is the probe positions of a $j^{th}$ iteration.

Further, in step S7, the predetermined number of iterations is greater than 100. The predetermined condition is that a position error satisfies a convergence condition, and a calculation formula of the position error is:

$$E_M = \frac{\sum_M (r'_m - r_m)}{M}, \tag{11}$$

in the formula, $E_M$ is the position error, M is the number of diffraction fields, $r'_m$ is coordinates of an actual position of a probe, and $r_m$ is coordinates of a correct position of the probe. The convergence condition is that the position error no longer changes drastically, and the specific value is set according to the actual application.

The technical solutions provided by the disclosure are further described in detail according to the following specific embodiments.

Figure 3:
FIG. 3 illustrates an amplitude pattern and a phase pattern of a sample to be tested used in a simulation process provided by an embodiment of the disclosure, where (a) is the amplitude pattern, and (b) is the phase pattern.
Figure 3:
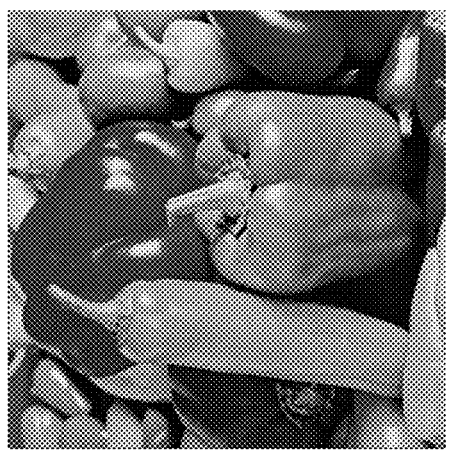
Figure 4:
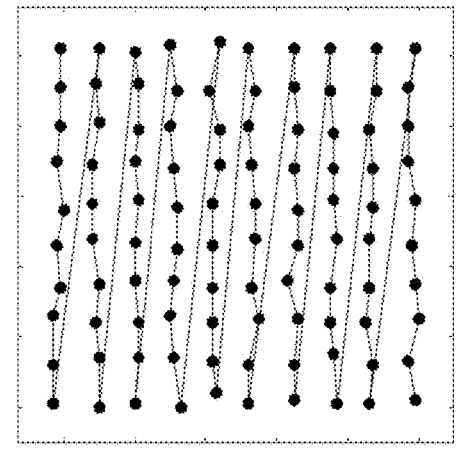
FIG. 4 illustrates two-dimensional motion plane trajectories of the sample to be tested in the ptychography imaging system provided by an embodiment of the disclosure, where (a) is a grid motion trajectory, and (b) is a concentric circle motion trajectory.
Figure 4:
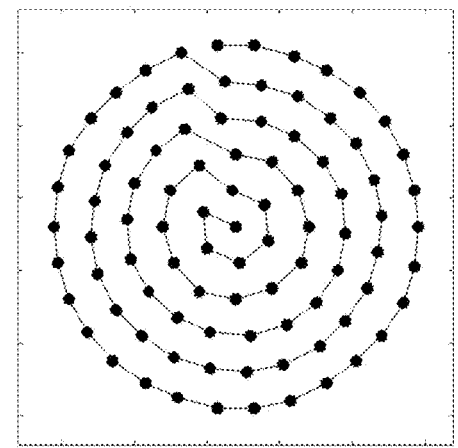
Figure 5:
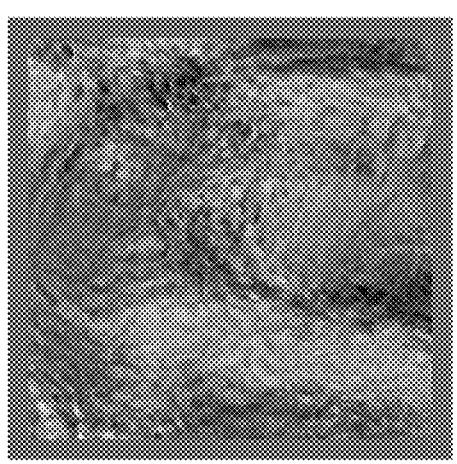
FIG. 5 illustrates patterns of intensity distributions of diffraction fields collected by illumination probes in the ptychography imaging system provided by an embodiment of the disclosure, where (a) is a sample amplitude construction pattern without position correction, and (b) is a sample phase reconstruction pattern without position correction.
Figure 5:
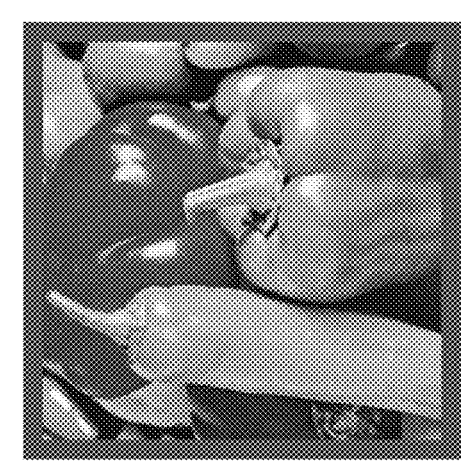
Figure 6:
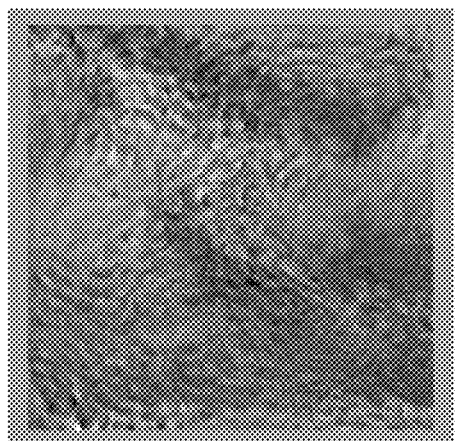
FIG. 6 illustrates patterns of intensity distributions of diffraction fields collected after correction by the method for ptychography position correction based on probe weighting provided by an embodiment of the disclosure, where (a) is a sample amplitude construction pattern after position correction, and (b) is a sample phase reconstruction pattern after position correction.
Figure 6:
Figure 7:
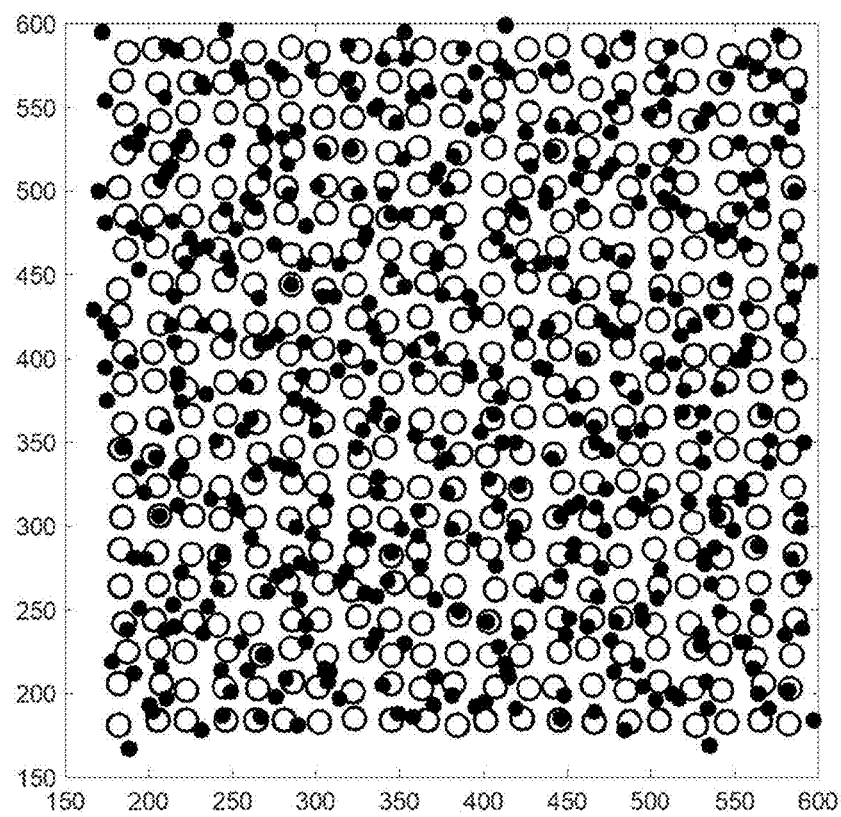
FIG. 7 illustrates graphs of position distributions of the illumination probes in the ptychography imaging system before and after correction provided by an embodiment of the disclosure, where (a) is the graph of the positions of the illumination probes before correction, and (b) is the graph of the positions of the illumination probes after correction.
Figure 7:
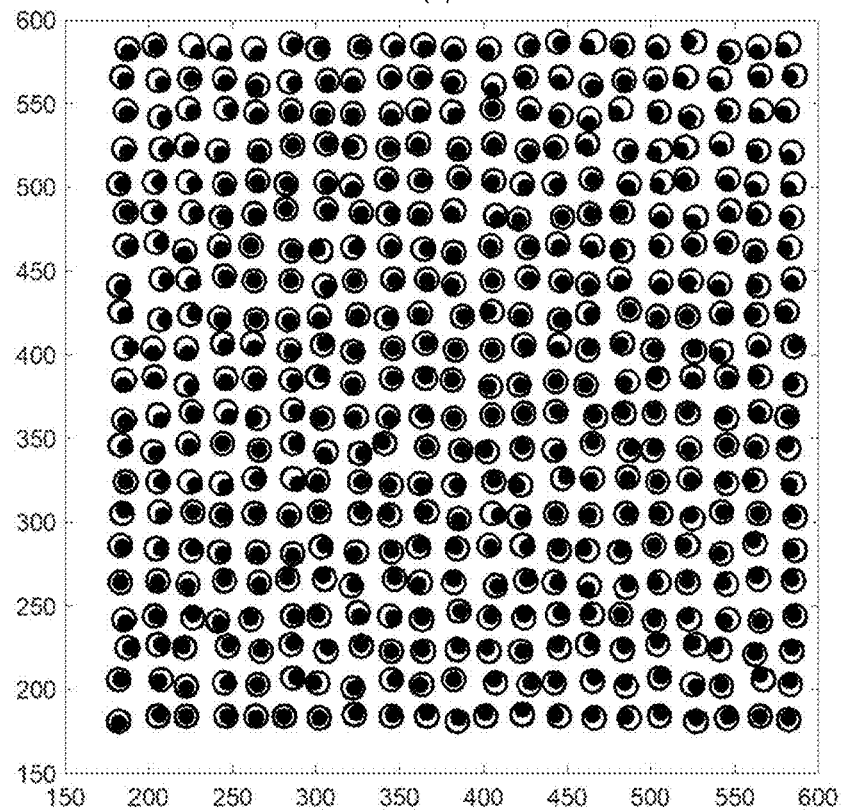

An optical path system of an experiment is set up. A working wavelength of the laser 1 is 632.8 nm, and a diameter (1/e2) of a light beam outputted by the laser 1 is 0.54 mm, which is expanded 10 times by the beam expander 2. The adjustable aperture 3 adjusts a speckle diameter to 2 mm. The collimated parallel light beam passes through the focusing lens/mirror 4 with an effective focal length of 10 cm, and then irradiates the sample to be tested 5 at a distance of approximately 1.5 mm from the back focal plane of the focusing lens. A precision motion platform drives the sample to be tested 5 to move in a two-dimensional plane according to a specific curve (including but not limited to a grid curve, a Fermat curve, a concentric circle curve, etc). At the same time, it should be ensured that an overlap area between adjacent probe speckles is not less than 60%, which is used as an overlap constraint between probes. Correction is performed using the method for ptychography position correction based on probe weighting as described above. FIG. 3 illustrates an amplitude pattern and a phase pattern of a sample to be tested used in a simulation process, where amplitude information is shown in (a) of FIG. 3, and phase information is shown in (b) of FIG. 3. The wavelength of the illumination probes is 632.8 nm, a size of the sample to be tested is 512×512 pixel, and a Gaussian light beam with a light beam diameter of 256×256 pixel is used. FIG. 4 illustrates two-dimensional motion plane trajectories of the sample to be tested in the ptychography imaging system, where (a) is a grid motion trajectory, and (b) is a concentric circle motion trajectory. The precision motion platform drives the sample to be tested 5 to move in a two-dimensional plane. As shown in FIG. 4, a motion step in an XY direction is 16 pixels, and the scan position of the sample to be tested is 21×21 areas. Therefore, a total of 441 coherent diffraction fields are collected by the CMOS camera. The position error is ±pixels. Before the position correction method is used, the mPIE operation is iterated for 200 times, and then the position correction method is used for 200 iterations. FIG. 5 illustrates patterns of intensity distributions of diffraction fields collected by illumination probes in the ptychography imaging system, where (a) is a sample amplitude construction pattern without position correction, and (b) is a sample phase reconstruction pattern without position correction. FIG. 6 illustrates patterns of intensity distributions of diffraction fields collected after correction by the method for ptychography position correction based on probe weighting, where (a) is a sample amplitude construction pattern after position correction, and (b) is a sample phase reconstruction pattern after position correction. FIG. 7 illustrates graphs of position distributions of the illumination probes in the ptychography imaging system before and after correction, where (a) is the graph of the positions of the illumination probes before correction, and (b) is the graph of the positions of the illumination probes after correction. In thus can be seen that by employing the method for ptychography position correction based on probe weighting provided by the disclosure, the position of the sub-pixel probe may be efficiently calibrated.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:
1. A method for ptychography position correction based on probe weighting, comprising:
S1: collecting diffraction light field intensity information of each scan position of a sample to be tested and simultaneously initializing information functions of illumination probes and the sample to be tested and probe positions;
S2: multiplying information parameters of the sample to be tested and the illumination probes at each scan position to obtain an exit wave;
S3: importing the exit wave obtained in step S2 into a propagation model to obtain a simulated diffraction light field, replacing intensity information in the simulated diffraction light field with the diffraction light field intensity information obtained in step S1, and obtaining an updated diffraction light field;

S4: importing the updated diffraction light field into a backpropagation model and obtaining a diffraction exit wave;

S5: updating the information functions of the sample to be tested and the illumination probes at each scan position based on the exit wave obtained in step S1 and the diffraction exit wave obtained in step S4;

S6: forming a probe matrix around the probe positions, calculating a correlation with the updated information functions of the sample to be tested and the illumination probes, and accordingly updating the probe positions; and S7: repeating steps S2 to S6 to iterate until a predetermined number of iterations is completed or a predetermined condition is reached according to the updated information functions of the illumination probes and the sample to be tested and the updated probe positions, outputting the information functions of the illumination probes and the sample to be tested and the probe positions, and accordingly completing the ptychography position correction.

2. The method for ptychography position correction based on probe weighting according to claim 1, wherein in step S1, the illumination probes and the illuminated sample to be tested maintain a same dimension.

3. The method for ptychography position correction based on probe weighting according to claim 1, wherein in step S3, propagation methods of the propagation model comprise Fresnel propagation, Fraunhofer propagation, and angular spectrum propagation.

4. The method for ptychography position correction based on probe weighting according to claim 1, wherein step S5 specifically is:

$$O_m'(r) = O_m(r) + \alpha \frac{P_m^*(r,\lambda)}{|P_m(r,\lambda)|_{max}^2}(\varphi_m'(r,\lambda) - \varphi_m(r,\lambda)) \text{ and}$$

$$P_m'(r,\lambda) = P_m(r,\lambda) + \beta \frac{o_m^*(r)}{|o_m(r)|_{max}^2}(\varphi_m'(r,\lambda) - \varphi_m(r,\lambda)),$$

in the formulas, $\alpha$ and $\beta$ respectively are updated and iterative search step sizes of the sample to be tested and the illumination probes, $O_m(r)$ and $O_m'(r)$ respectively are the information functions of the sample to be tested before and after a $m^{th}$ scan position is updated, $P_m(r,\lambda)$ and $P_m'(r,\lambda)$ respectively are the information functions of the illumination probes before and after the $m^{th}$ scan position is updated, $\varphi_m(r,\lambda)$ and $\varphi_m'(r,\lambda)$ respectively are the exit wave and the diffraction exit wave at the $m^{th}$ scan position, r is coordinates in real space, $\lambda$ is a wavelength of the illumination probes, and * is a conjugate operation of a complex matrix.

5. The method for ptychography position correction based on probe weighting according to claim 1, wherein step S6 specifically is:

S61: translating the illumination probes up, down, left, and right around the probe positions to form the probe matrix, $$r_m'(i) = r_m(i) + l_i$$

in the formula, $r_m'(i)$ is coordinates in real space of an $i^{th}$ illumination probe at a $m^{th}$ scan position in the probe matrix, $r_m(i)$ is center coordinates of the $i^{th}$ illumination probe in the probe matrix at the $m^{th}$ scan position, and $l_i$ represents a shift distance between the $i^{th}$ illumination probe in the probe matrix relative to a center of the probe positions;

S62: calculating the correlation between the probe matrix obtained in step S61 and the updated information functions of the sample to be tested and the illumination probes, $$CC_m(i) = \sum O_m'(r) \cdot P_m'(r,\lambda) \cdot P_m(r_m'(i),\lambda) \cdot O_m(r),$$

in the formula, $CC_m(i)$ is a correlation numerical matrix in the probe matrix, $O_m'(r)$ is the information function of the sample to be tested after the $m^{th}$ scan position is updated, $P_m'(r,\lambda)$ is the information function of the illumination probes after the $m^{th}$ scan position is updated, $P_m(r_m'(i),\lambda)$ is the information function of the $i^{th}$ illumination probe in the probe matrix before the math scan position is updated, and $O_m(r)$ is the information function of the sample to be tested before the $m^{th}$ scan position is updated; and S63: updating the probe positions according to the correlation obtained in step S62, $$D_j = \beta'\left[\sum CC_m(i) * r_m'(i)\right] + \gamma D_{j-1},$$

in the formula, $\beta'$ is an updated and iterative search step size of the probe position, $\gamma$ is a ratio of the update to keep the previous update step size, and $D_j$ and $D_{j-1}$ respectively are probe positions of the j-th iteration and the j-1-th iteration.

6. The method for ptychography position correction based on probe weighting according to claim 1, wherein in step S7, the predetermined number of iterations is greater than 100.

7. The method for ptychography position correction based on probe weighting according to claim 1, wherein in step S7, the predetermined condition is that a position error satisfies a convergence condition, and a calculation formula of the position error is:

$$E_M = \frac{\sum_M (r_m' - r_m)}{M},$$

in the formula, $E_M$ is the position error, M is the number of diffraction fields, $r_m'$ is coordinates of an actual position of a probe, and $r_m$ is coordinates of a correct position of the probe.

* * * * *